United States Patent [19]

Longenecker et al.

[11] 3,985,070

[45] Oct. 12, 1976

[54] CONTINUOUS IN-FEED HIGH SPEED PRE-COOKING MACHINE SYSTEM FOR THE PRODUCTION OF COOKED DOUGH FOODSTUFFS

[75] Inventors: John G. Longenecker, Ozone Park, N.Y.; Manuel J. Rubio, Bridgeport; Ciro M. Robustelli, Stamford, both of Conn.

[73] Assignee: Roberto Gonzales Barrera, Monterrey, Mexico

[22] Filed: June 6, 1975

[21] Appl. No.: 584,408

Related U.S. Application Data

[60] Continuation of Ser. No. 415,406, Nov. 13, 1973, which is a division of Ser. No. 171,068, Aug. 12, 1971, Pat. No. 3,773,520.

[52] U.S. Cl. .............................. 99/353; 99/443 C
[51] Int. Cl.² .......................................... A23L 1/10
[58] Field of Search ............... 99/353, 354, 355; 426/502–505

[56] References Cited
UNITED STATES PATENTS

| | | | |
|---|---|---|---|
| 2,401,236 | 5/1946 | Fielitz | 99/353 |
| 2,912,330 | 11/1959 | Hank et al. | 99/353 |
| 2,917,827 | 12/1959 | Lankford | 99/353 |
| 2,980,012 | 4/1961 | Ramirez, Sr. | 99/353 |
| 3,060,837 | 10/1962 | Porambo | 99/353 |
| 3,067,671 | 12/1962 | Graves | 99/353 X |
| 3,263,592 | 8/1966 | Hickey et al. | 99/353 |
| 3,336,137 | 8/1967 | Hickey | 99/353 |
| 3,548,743 | 12/1970 | Pikel | 99/353 |

FOREIGN PATENTS OR APPLICATIONS

| 161,629 | 6/1956 | Sweden | 99/353 |
|---|---|---|---|

*Primary Examiner*—Edward L. Roberts
*Attorney, Agent, or Firm*—Parmelee, Johnson & Bollinger

[57] ABSTRACT

A continuous machine system for producing a cooked dough-type product by utilizing pre-cooking of the dough while being mixed prior to shaping enabling a reduction of oven dwell time to a minimum while obtaining the commercially desired characteristics in the final product. Proper pre-cooking dough temperature is achieved by mixing heated liquid with the ingredients or heating the mixing vessel or both. A delicate balance between pre-cooking action is achieved to produce an attractive appearing and delicious product, and the machine system components are synchronized to yield a continuous high speed economical process resulting in a product such as a tortilla possessing the desired characteristics of taste, texture and appearance.

5 Claims, 15 Drawing Figures

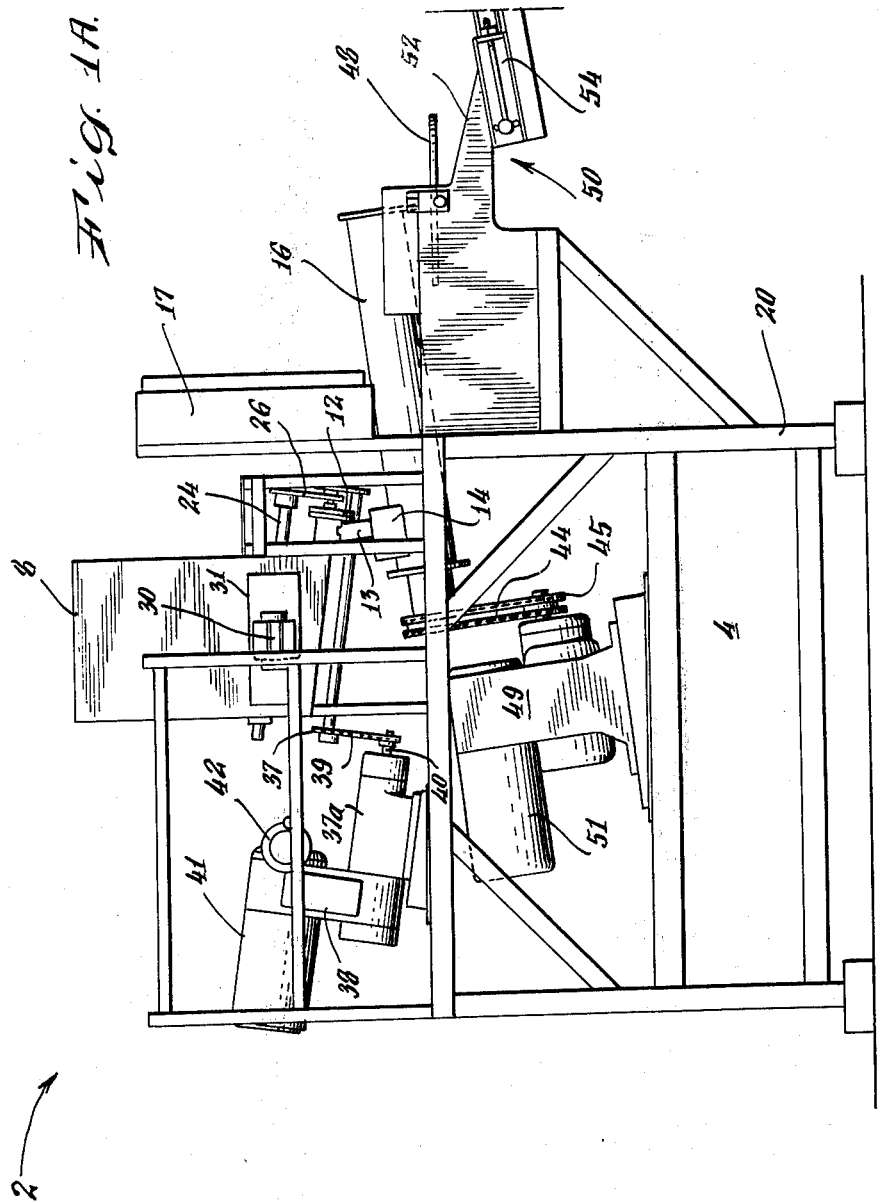

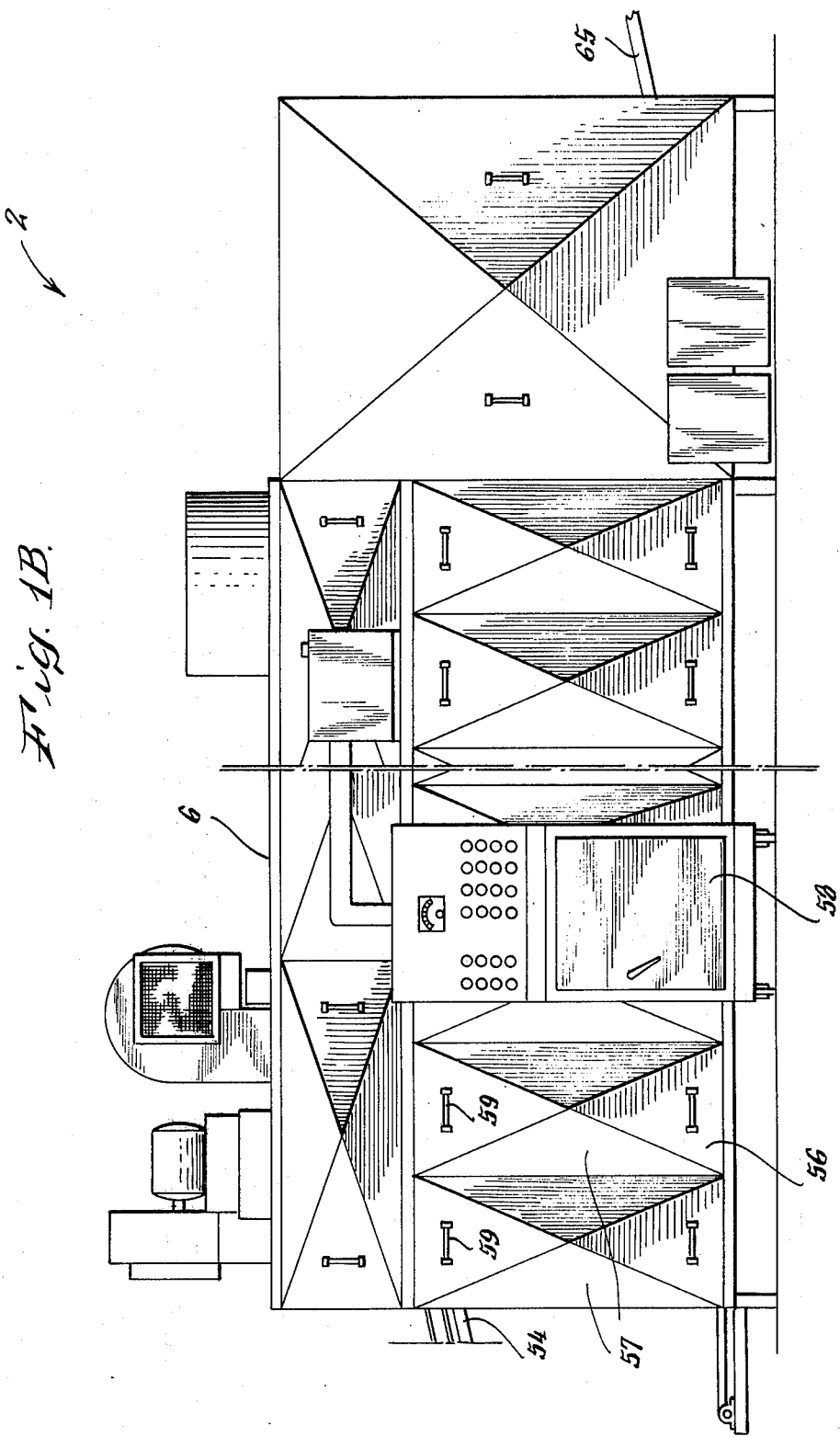

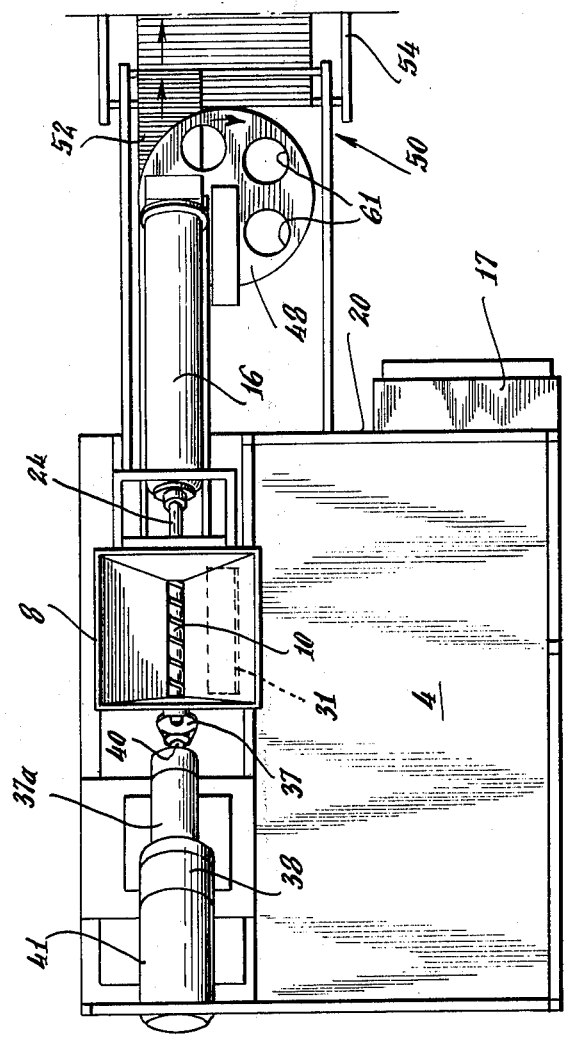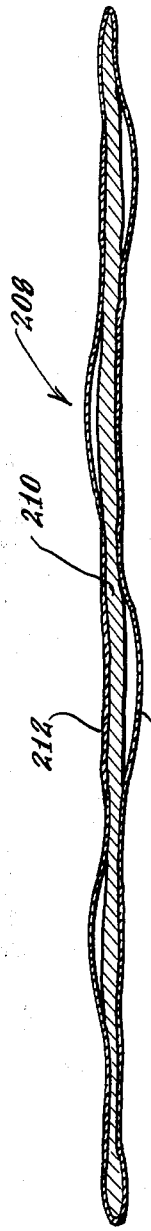

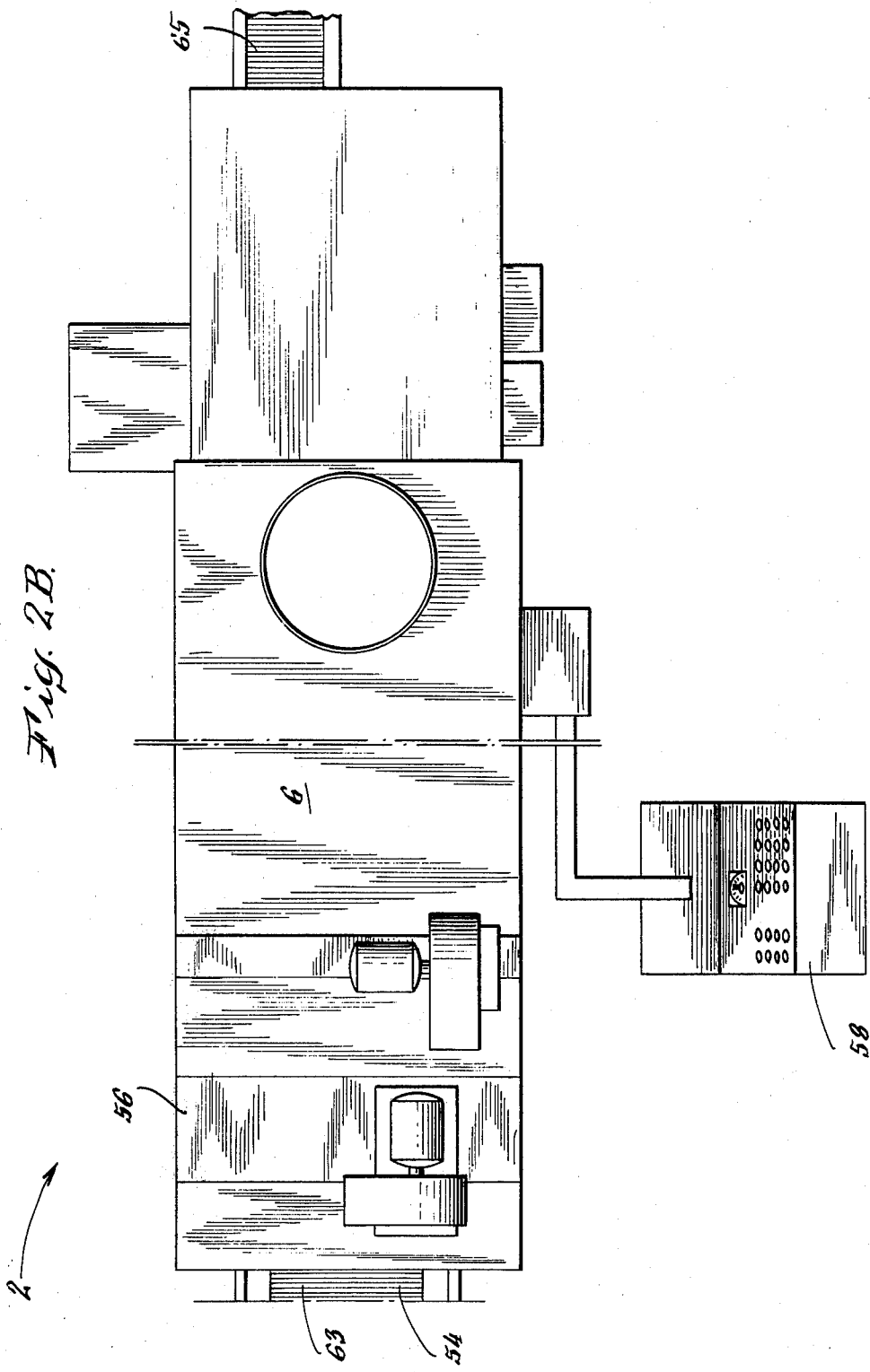

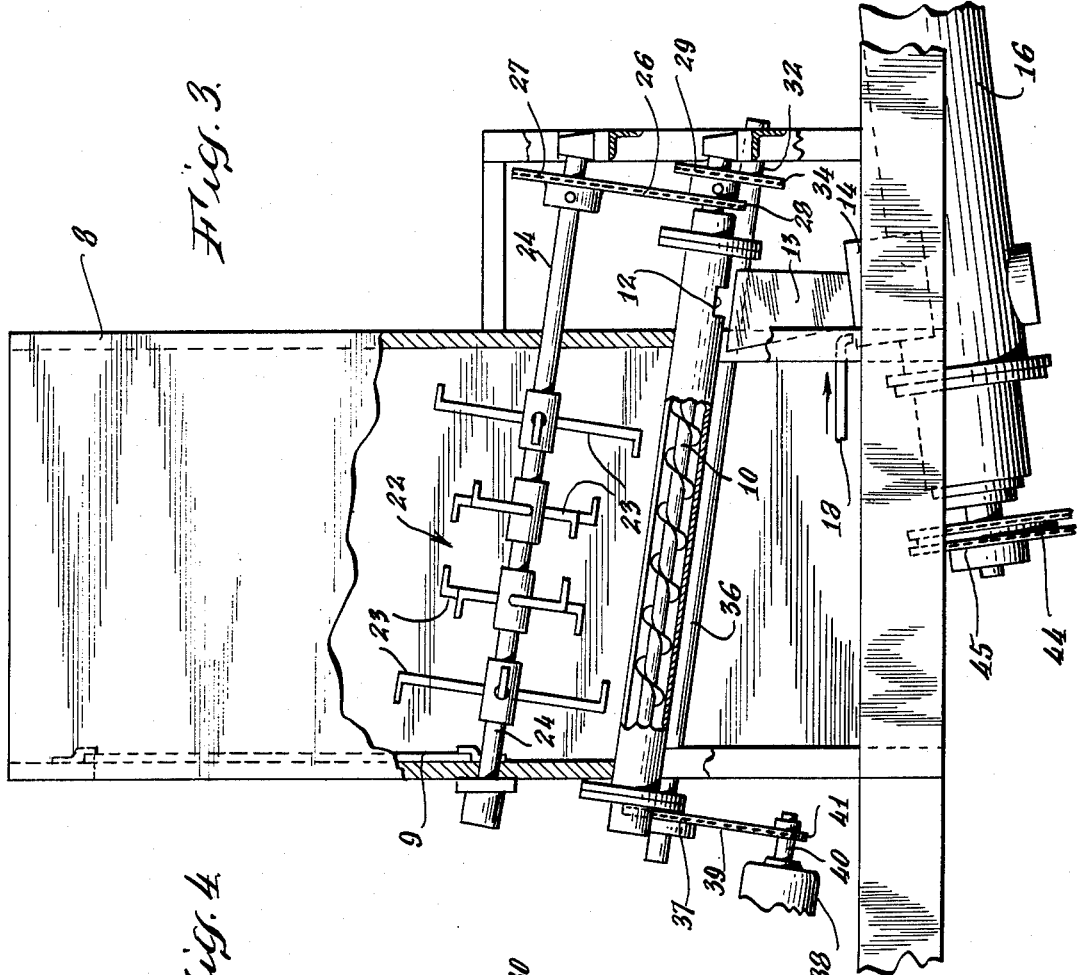
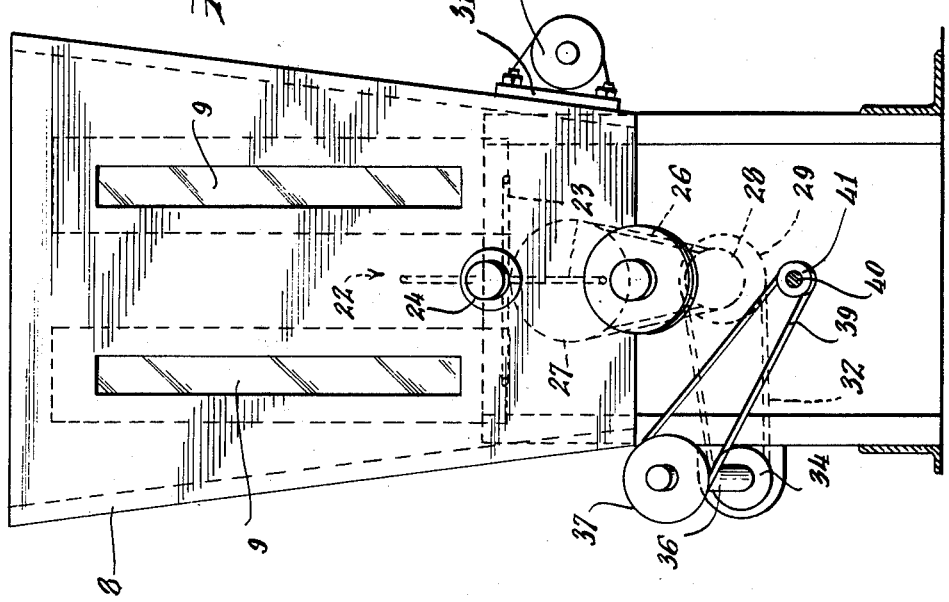

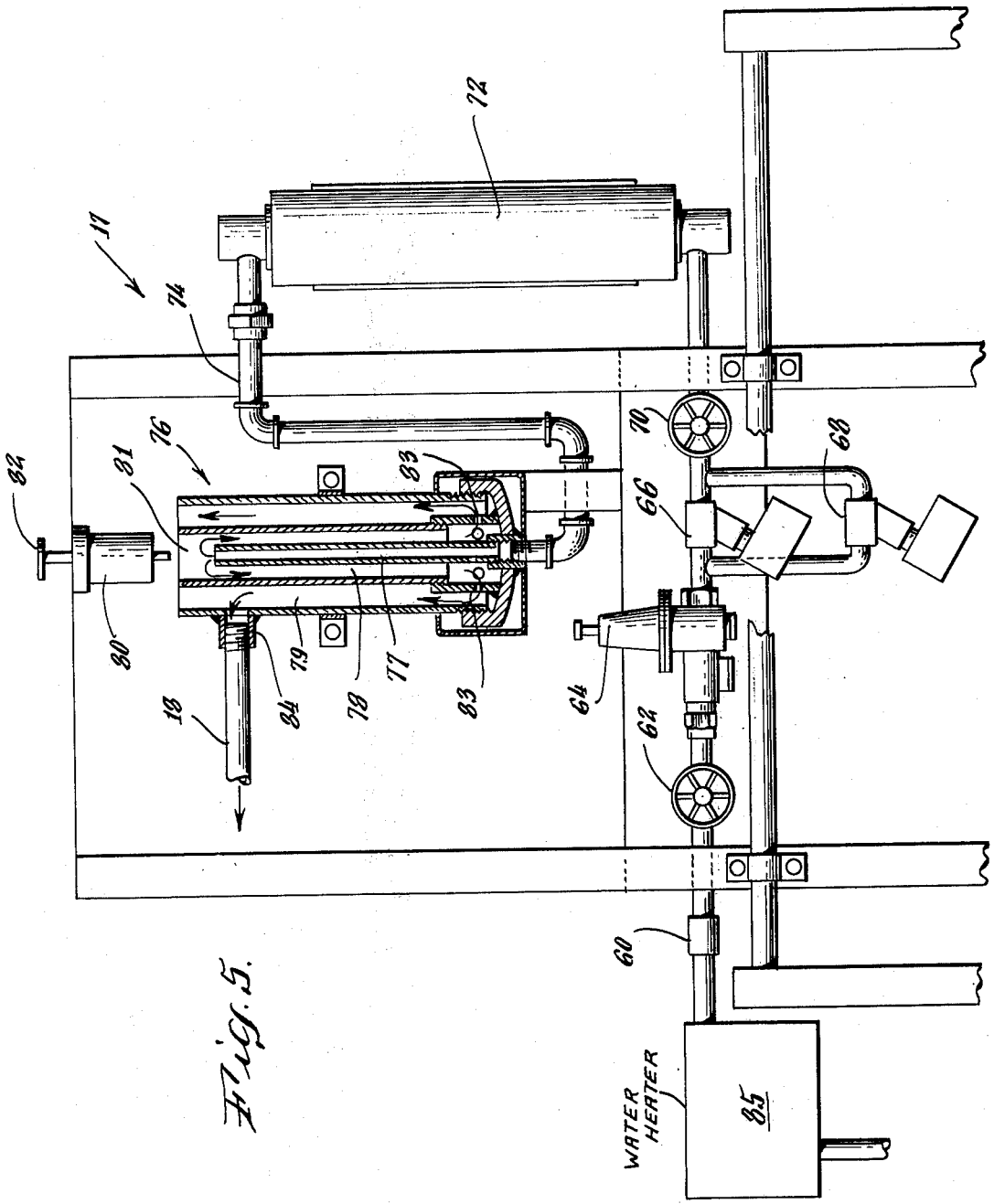

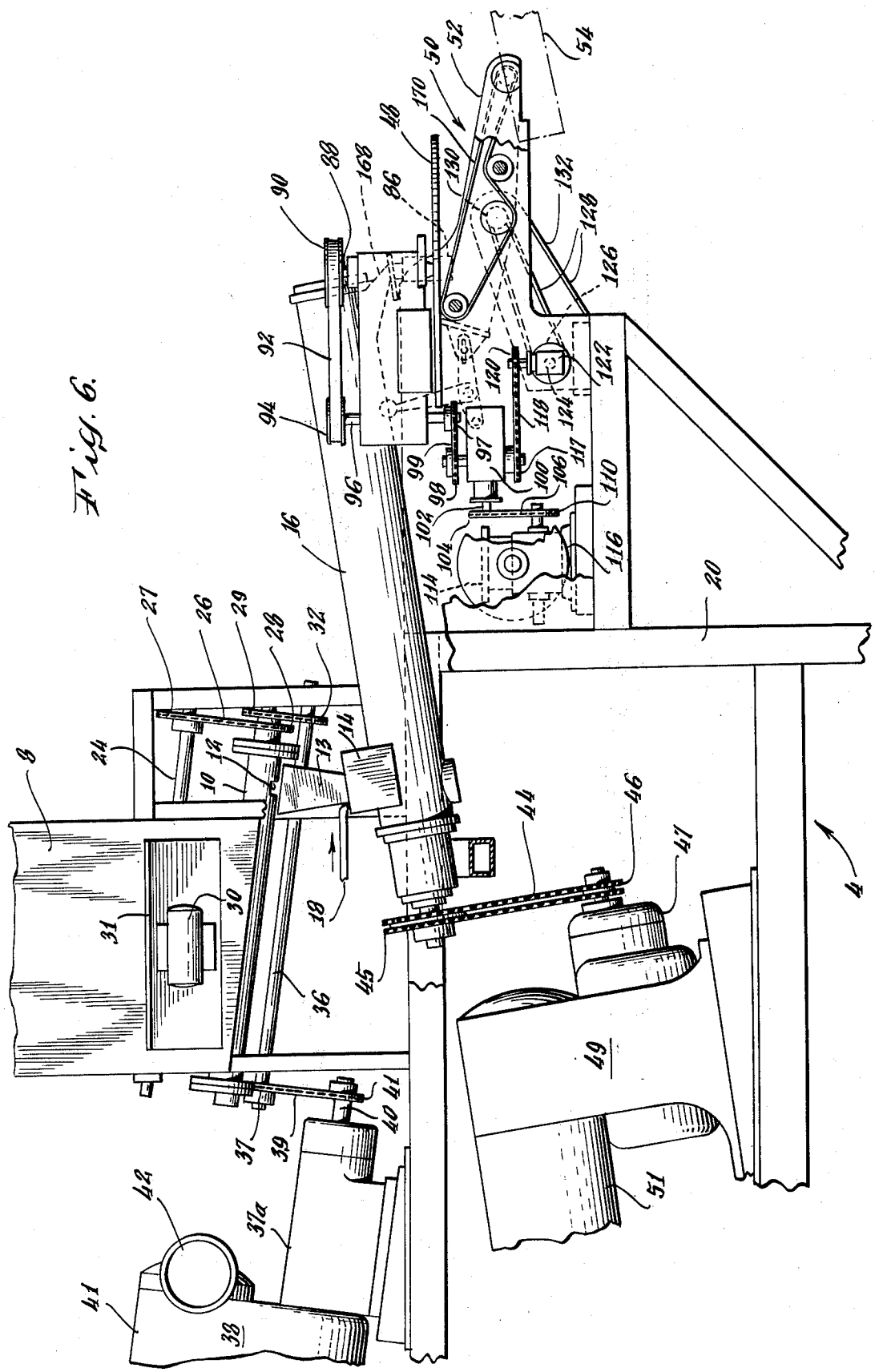

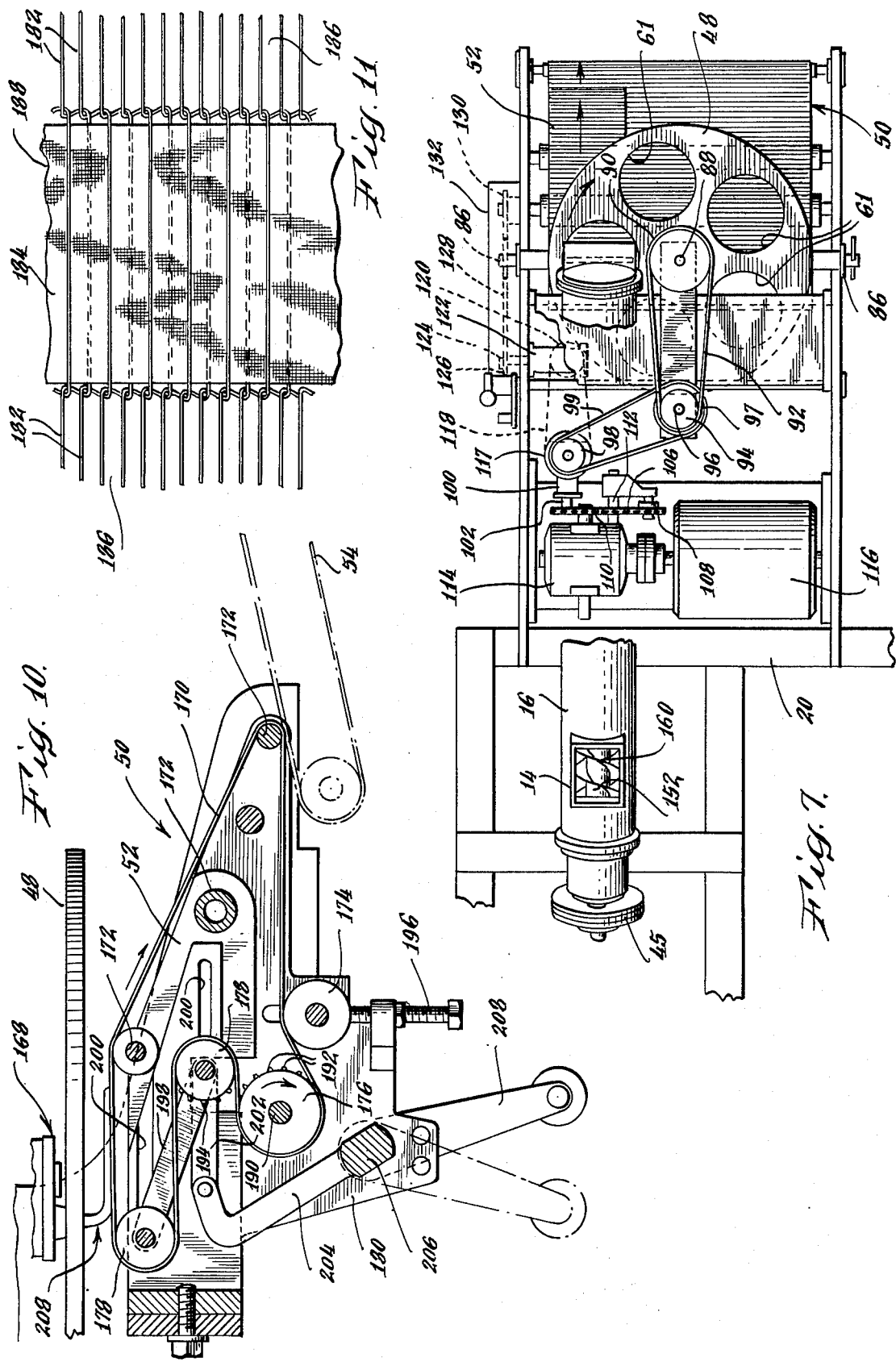

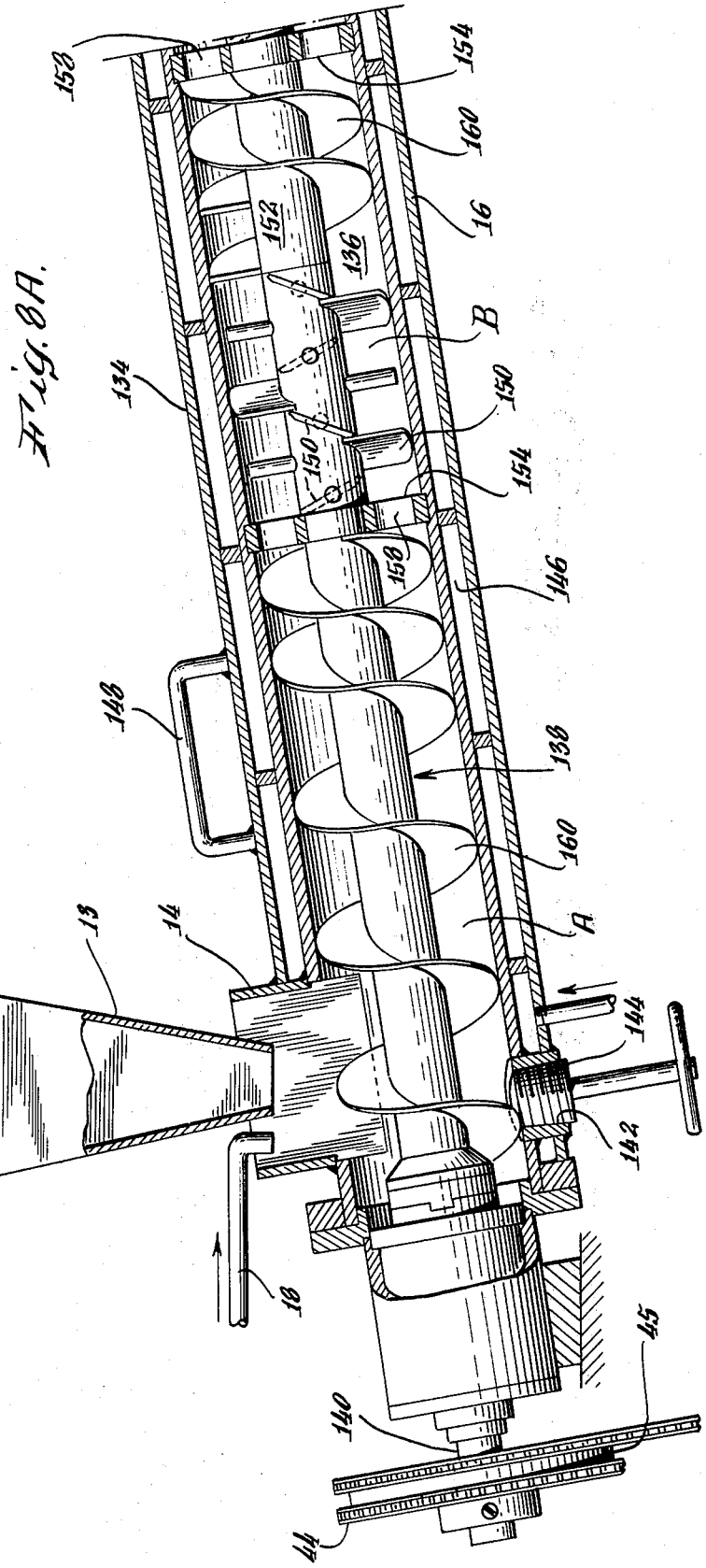

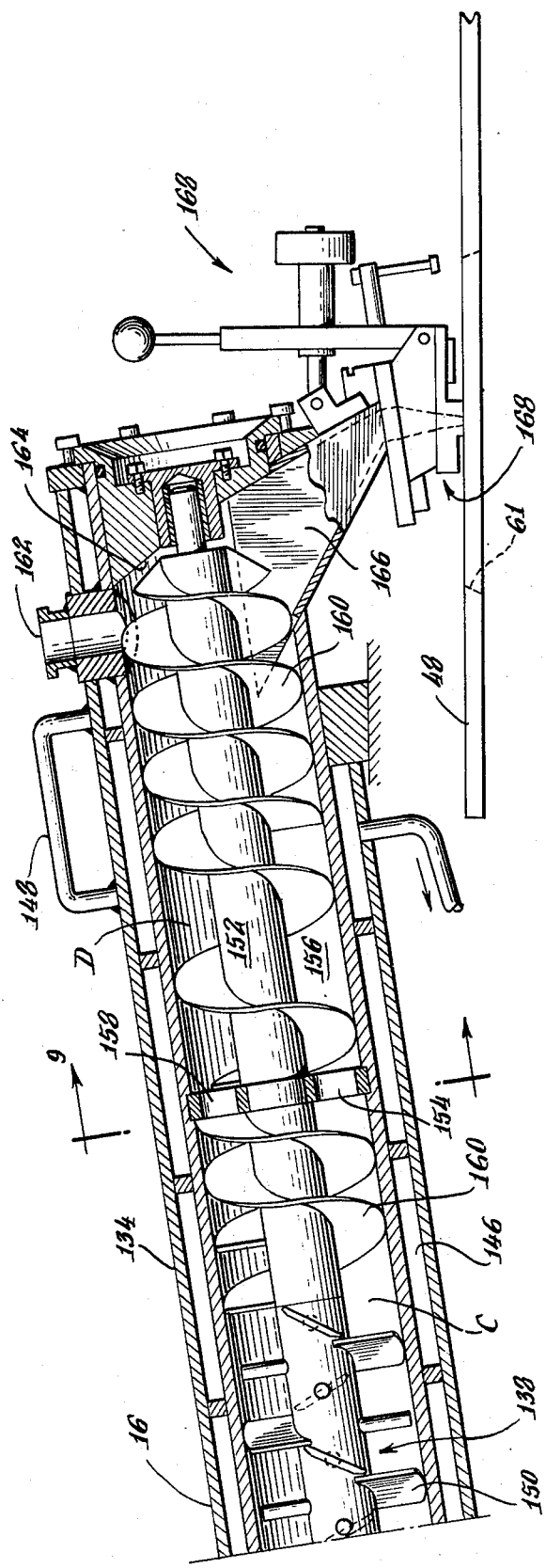
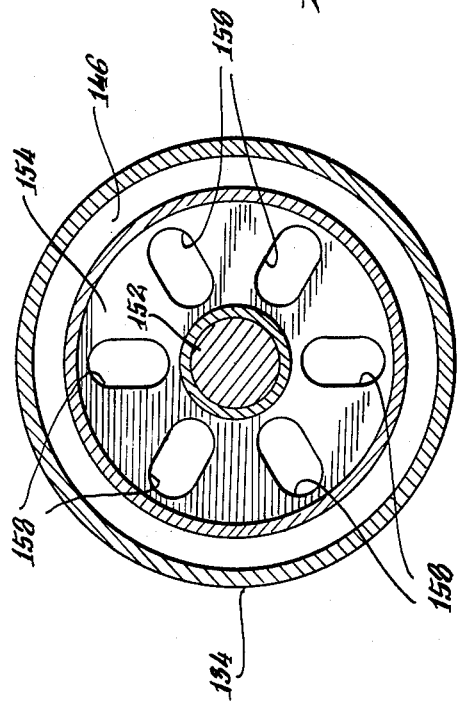

CONTINUOUS IN-FEED HIGH SPEED PRE-COOKING MACHINE SYSTEM FOR THE PRODUCTION OF COOKED DOUGH FOODSTUFFS

This is a continuation of divisional application Ser. No. 415,406, filed Nov. 13, 1973, which was a division of prior patent application Ser. No. 171,068 filed Aug. 12, 1971, now issued as U.S. Pat. No. 3,773,520, issued Nov. 20, 1973.

DESCRIPTION

This invention relates to the continuous in-feed, high speed pre-cooking machine system for the production of cooked foodstuffs made from dough. The illustrative embodiment of the invention more particularly relates to a continuous high speed pre-cooking machine system for the production of cooked, round, thin cakes of unleavened cornmeal, commonly known as tortillas.

Cooked dough foodstuffs, such as pizzas, pancakes, and tortillas, have become increasingly popular food items. The tortilla, a tasty cornmeal cake, usually eaten hot with or without a topping, or rolled with seasoned meat to form an enchilada, has been in great demand for many, many years, but there has been no efficient and economical apparatus for its high speed commercial production. Consumers have come to expect that a tortilla be a substantially round, thin cornmeal cake consisting of three layers, namely a moist cooked center layer surrounded on top and bottom by a light-colored skin and having skin flexibility sufficient to enable the tortilla to be rolled around other foodstuffs to make enchiladas, or the like. The top and bottom skins desirably have large blisters. In a tortilla which meets the approval of a connoisseur, the upper and lower skins are usually of such completely cooked and browned character that they can be partially peeled away from the moist center layer by a person's fingers. In areas where a blister is present, the skin has peeled itself away from the center layer. Thus, a commercial tortilla must possess not only the requisite taste and inner cooked texture and consistency but must be appealing to the eye and preferably have at least one skin blister.

Prior art processes and apparatus attempting to produce tortillas meeting the above requirements, have done so only in a laborious and time-consuming manner. Cooked dough foodstuffs, such as tortillas, in the prior art, were produced by first mixing ingredients, such as flour and a liquid to form a dough, then shaping the dough into the desired form and finally cooking it on calcium, salt-coated, hot metal slats in the nature of a griddle to yield the end product. Attempts to speed up the cooking by raising the temperature or heating action applied to tortillas only caused a burning or blackening of the exterior while leaving the interior in an unsuitable semi-raw or uncooked condition.

By virtue of pre-cooking of the dough in accordance with the present invention, only a modest amount of additional heat is needed to cook the inside. Thus, a short oven residence time under intense heating action is utilized, thereby avoiding excess drying or burning effect on the skins.

The present invention is an important forward jump and breakthrough in this cooking art which overcomes a "bottleneck" that has defied solution for many, many years. This invention overcomes the time-consumption problem associated with the prior art and enables the production of commercially attractive and delicious tortillas at the rate of four hundred to six hundred tortillas per minute, while providing the desirable consumers' criteria of taste and appearance, as discussed above. An effective pre-cooking of the dough within a predetermined temperature range during the mixing and shaping steps is accomplished in preparation for a final intense cooking under intense heating action. The significance of this unique concept may be appreciated by recognition of the fact that in commercial production of cooked foodstuffs, the most time-consuming step or "bottleneck" occurs generally in the final cooking of the product. Reducing the final cooking dwell time, therefore, results in considerable time savings. This, plus efficient synchronization of the various process steps and machine components, yields a vastly improved overall system.

It is an object of this invention to provide a continuous high speed process for the production of cooked dough foodstuffs, such as tortillas, pizzas, pancakes, and the like, that include an effective pre-cooking step.

It is a further object of this invention to provide a synchronized machine system for the continuous high speed production of cooked dough foodstuffs.

In one of its aspects, the present invention involves effective pre-cooking of tortilla dough within a predetermined temperature range during the mixing and shaping of the dough into a blank.

In another of its aspects, the present invention involves reducing the dough foodstuff final cooking dwell time to a minimum so that during the final cooking step an intense but brief cooking action is applied, having the advantage of cooking the desired upper and lower skin without excess drying while completing the internal cooking of the product.

One effective manner of providing the pre-cooking action is pre-heating the liquid to a predetermined temperature range before it is mixed with flour to form the dough. A hot water jacket on the dough mixing vessel may serve as an effective heat source for pre-cooking also. Additionally, the dough mixing vessel may be combined with the dough shaping means.

Another object of the invention, therefore, is the provision of an effective heat source to produce the predetermined temperatures for pre-cooking of the pastry dough foodstuff.

An additional feature of the invention includes a hot liquid feed arrangement, a continuous mixing system having a composite extruder screw system feeding the dough material to a shaping die, all of which may be in dual assembly, and a conveying system carrying the partially cooked shaped dough blanks to an infra-red oven.

The various aspects, features and advantages of the foodstuff production apparatus of the present invention will be more fully understood from a consideration of the following detailed description in conjunction with the accompanying drawings, in which:

FIGS. 1A and 1B together show a side elevational view of a complete continuous high-speed tortilla producing machine system according to the present invention, and more particularly:

FIG. 1A shows the metering in-feeder, pre-cooking mixer-extruder and former of the system;

FIG. 1B shows the high-temperature oven and related parts of the system;

FIGS. 2A and 2B together show a top plan view of the machine system, shown in FIGS. 1A and 1B, with FIGS. 2A and 2B, respectively, showing top views of the corresponding portions shown in FIGS. 1A and 1B;

FIG. 3 is a side elevational view of the flour hopper and flour metering in-feed means showing also the related drive components;

FIG. 4 is an elevational view of the flour hopper shown in FIG. 3, as seen from the left in FIG. 3;

FIG. 5 is an elevational view of the water heating metering and additive feed and liquid mixing system;

FIG. 6 is a side elevational view of the hopper and metering in-feed system in conjunction with the pre-cooker mixer-extruder and former system and their drive mechanisms;

FIG. 7 is a top plan view of the pre-cooker mixer-extruder and former system shown in FIG. 6, together with its drive mechanism;

FIGS. 8A and 8B, together, show a side elevational sectional view of the pre-cooker mixer-extruder and former system and more particularly;

FIG. 8A shows the ingredients feed end of the pre-cooker mixer-extruder;

FIG. 8B shows the output die and cut-off former end thereof;

FIG. 9 is an elevational, sectional view through the extruder chamber, taken on line 9—9 of FIG. 8B, and showing an intermediate orifice mixing plate;

FIG. 10 is a side elevational view of the conveyor system for carrying partially cooked foodstuff blanks from the extruder die and former to the oven, which conveyor system is retractable, when desired, for diverting product away from the oven;

FIG. 11 is an enlarged plan view of a portion of the conveyor link belt; and

FIG. 12 is an enlarged cross-sectional view through a properly formed and cooked tortilla, illustrating the central layer and the upper and lower light-colored, flexible blistered skins.

Referring to FIGS. 1A and 1B, and 2A and 2B in greater detail, there is shown the layout of the overall tortilla machine system designated generally by the reference numeral 2 and which includes the metering in-feeder and pre cooker, mixer-extruder former assembly 4 and the high-temperature oven 6. FIGS. 1A and 2A, in particular, show the assembly 4 as comprised of a flour hopper 8 with a flour feed and metering screw 10 for supplying corn flour at flour outlet 12 (FIG. 3) down a chute 13 into the feed box 14 of the pre-cooker, mixer-extruder and former apparatus 16. Also supplying the feed box 14 is a liquid delivery pipe 18 (FIG. 3) which leads from the hot water feed system (shown in FIG. 5).

The flour hopper 8 and the apparatus 16 are supported together with their respective drive mechanisms (to be described later) on a frame 20.

The flour in hopper 8 is maintained in a free-flowing state by means of a flour agitator 22 (FIG. 3) having arms 23 mounted on a shaft 24. The agitator shaft 24 is driven by a chain 26 passing around a gear 27 and also around a gear 28 on the shaft of the flour metering feed screw 10. In addition to the flour agitator, there is provided a vibrator 30 (see also FIG. 6) mounted on a rigid vibration-distribution plate 31 secured to the side of the hopper 8 to vibrate the hopper wall to ensure that the flour does not bridge in the hopper and cease to flow. The hopper 8 converges downwardly to the flour feed and metering screw 10 which is driven by a chain 32 passing over a gear 29 and a gear 34 on a jack shaft 36 situated outside of the hopper. The jack shaft in turn is powered by a chain drive 39 from the output end of a gear reducer 37A and an adjustable-speed unit 38 driven by a motor 41. The speed of the power source output shaft 40 can be regulated by turning a hand wheel 42.

The metering screw leads to flour outlet 12 and chute 13. Situated downstream of chute 13 is feed box 14 of the pre-cooker, mixer-extruder and former apparatus 16. As shown in FIG. 6, the pre-cooker, mixer-extruder and former has an extruder screw therein (see FIGS. 8A and 8B) driven by a chain drive 44 passing around gears 45 and 46. A speed-reduction gear unit 47 is driven through a variable speed drive 49 from a motor 51 (FIG. 6.) Also shown in FIG. 1A is the extruder rotary cut-off former disc 48 and conveyor system 50, including intermediate conveyor 52 and an oven conveyor 54 (see FIG. 2A).

FIG. 1B shows the cooking oven 56 and the main control cabinet 58. The oven control 58A is shown in FIG. 2B mounted on the side of the oven and connected to the control cabinet 58 through an electrical conduit duct. In the illustrative embodiment, the oven is a conventional gas-fired, infra-red cooking oven which has been modified for the conveyor passing therethrough to operate at higher than standard transit rate. Additional modification involves replacing components affected by high operating temperatures as well as extending all of the conveyor shafts, so that the bearings are all located near the removable side panel doors 57 having hand holds 59 and lubricants are used which are designated for severe temperature service. The oven conveyor 54 is linked wire conveyor formed of bright stainless steel wire. Due to their high reflectance, the bright wire links of the conveyor reflect most of the infra-red heat, so that the conveyor links remain sufficiently cool to avoid scorching the tortillas at the contact regions therewith.

In operation, flour, in the case of tortillas, ground cornmeal, is placed in the hopper 8. A predetermined quantity per minute is fed to the flour outlet 12 by controlling the speed of the feed screw 10 and thus metering the feed rate. The regulated amount fed is synchronized with other variables to be discussed later. From the flour outlet 12 (seen in FIG. 3), flour is introduced through chute 13 into the feed box 14 along with liquid, which is water for tortillas, from delivery pipe 18. The liquid in this tortilla-making system is preheated and accurately metered, so as to bring the flour-liquid mix to the desired pre-cooking temperature and consistency. The liquid may contain food additives, such as preservatives, if desired. The latter are added and the liquid metered in a mixer and metering system 17, to be discussed later (see FIG. 5).

From the feed box 14 (see also FIG. 8A), the mix passes through the interior of the pre-cooker, mixer-extruder and former apparatus 16 where it is thoroughly mixed as well as advanced by the extruder screw therein (see FIGS. 8A and 8B).

The liquid and flour introduced into the feed box 14 (FIG. 1A) are mixed by the extruder screw while undergoing pre-cooking either due to the temperature of the feed liquid or the heat from the extruder jacket (or both FIG. 8A), to be discussed later. Thus, the partially cooked dough is expressed through a die 167 (FIG. 8B) and the openings 61 (FIG. 2A) in rotary disc 48 to form a blank, in the case of a tortilla, a round thin cake. The tortilla at this point is pre-cooked and moist throughout. The pre-cooked dough blank is then conveyed to the oven 56, by the intermediate and oven conveyors 50 (FIG. 2A). Once in the oven, the tortilla blank surfaces are subjected to intensive infra-red heating action which cooks them to give them a blistered skin due to the escape of internal moisture as steam. The tortilla blank is conveyed through the oven on a shining stainless steel wire link belt 63 which reflects heat and runs cool (FIGS. 2A and 2B). Three passes are made, only two of which are cooking passes. In its second pass, the blank is inverted so that both sides are evenly cooked. The dwell time of the tortilla in the oven can be, because of the present invention, extremely brief, e.g. usually less than 30 seconds. The fully cooked tortilla is removed at the oven exit by the conveyor 65 and may be stored or packaged or further handled, as desired.

In commercial operation, the above steps are synchronized to maximize speed and efficiency while retaining product uniformity and quality. This may be easily accomplished by the system operator who may observe the product and regulate the flour feed by adjusting variable speed drive 38, 42 (FIG. 1A) and the extruder screw speed by adjusting variable speed drive 49, all being synchronized with the preset speed of the cutter disc 48 and conveyor system 50. Also, the liquid temperature and flow rate are regulated by the operator, and the oven temperature and other variables are controlled from console 58.

Preferably, the cutter disc 48 (FIGS. 2A and 7) speed of rotation is preset to the desired production rate of tortillas per minute per mixer-extruder. The intermediate conveyor 52 (FIG. 6) is timed to run fast enough relative to the speed of the cutter disc, so as to take the extruded tortillas away without altering their shape. All other steps are adjusted and regulated accordingly to be in the most efficient synchronization with the cutter disc.

In preferred operation, cornmeal flour and water are introduced into the feed box, the water having been heated to a temperature such that the flour-water mixture or dough will be at a workable pre-cooking temperature. In the case of cornmeal and water for making tortillas this temperature is desirably in the range which is somewhere between 115° F. and the gelatinizing temperature is approximately 165° F., and sometimes several degrees above or below, depending upon the cornmeal conditions and dwell time. Hot water may also be introduced into the extruder water jacket in order to maintain the desired pre-cooking temperature. If the feed water has not been heated, the water temperature in the hot water jacket can be set sufficiently high to bring the dough mixture to the desired temperature. It is important that the dough be kept below the temperature at which it becomes too gelatinized for effective extrusion, which, for cornmeal and water, is approximately 165° F. The temperatures employed are, to a degree, dependent upon the residence time of the dough in the mixer-extruder which, in turn, is a function of the speed of the extruder screw. The preferred operation, in making tortillas, is to hold the dough at approximately 120° F. to 150° F., while the residence time in the extruder is about thirty to eighty seconds, or long enough to insure a good mix. An optimum temperature range is 130° F. to 140° F. The degree of precooking thus achieved in the preferred operation will permit an oven dwell time of approximately fourteen to 24 seconds in any event less than thirty seconds. While the system has been described with reference to a production rate of two hundred to three hundred tortillas per minute, this rate may be readily doubled by including a tandem line of hoppers and pre-cooking, mixer-extruder formers which utilize the same rotary former cutter disc and the same oven.

Referring to FIGS. 3 and 4 in greater detail, there is shown the flour hopper 8 with its flour feed screw 10 and related internal drive components. As best shown in FIG. 3, the hopper 8 has a vibrator 30 attached thereto. The vibrator 30 applies its effect to the hopper by acting through a vibrator distributor plate 31. Inside the hopper there is a flour agitator 22 which has bent arms 23 located on a shaft 24. This shaft is rotated by the action of chain drive 26 passing around gear 27 of the flour agitator shaft and gear 28 of the flour feed screw. The flour feed screw 10 is powered in turn by a chain 32 passing over the gear 29 of the feed screw and a gear 34 located on jack shaft 36 (FIG. 4). The jack shaft 36 is located externally of the hopper and serves to provide power drives to the shaft components within the hopper. The jack shaft receives its power input from a chain drive 39 passing over jack shaft gear 37 and powered by the output shaft gear 41 of variable speed power source 38 (FIG. 1A).

FIG. 4 shows also the transparent rigid plastic windows 9 running the length of the hopper and through which the quantity and feeding condition of the flour may be observed. Looking at FIG. 3 once again, there is shown the flour outlet 12 from whence the flour is fed into the feed box 14, being guided by a flour chute 13. Also emptying into the feed box 14 of the mixer-extruder apparatus 16 is the liquid delivery pipe 18, as discussed above.

FIG. 5 shows the liquid mixer and metering arrangement 17 of the liquid feed system. The liquid is heated by a water heater 85 and introduced into an input conduit 60. The input conduit 60 contains a system shut-off valve 62, pressure regulator 64, solenoid valve 66, and auxiliary back-up solenoid valve 68 as well as manual flow control needle valve 70. After the needle valve 70 the liquid flows into a flow meter 72 and thence through a pipe 74 into a mixing chamber 76. The mixing chamber 76 is comprised of an upward flow pipe 77 and two concentric annular chambers 78 and 79 which guide the liquid in the flow path indicated.

The mixing chamber is open at the top in the region 81 near the upper end of the inner pipe 77 to permit introduction of other components such as those from the additive dispenser and metering device 80. The additive dispensing rate is controlled by regulating a knob 82 which controls an internal valve. There are multiple small orifices 83 communicating from the lower end of the annular chamber 78 into the annular chamber 79 to produce turbulent mixing action. The mixing chamber output 84 is suitably connected to the liquid delivery pipe 18 which leads to the feed box 14 (FIG. 3).

In operation, the liquid, usually water, is heated by the water heater 85 prior to being introduced into the liquid mixing and metering system 17. The system shut off valve 62 is in its open position, except when the system is shut off. The liquid proceeds through the pressure regulator 64 which protects the system from surges in the line pressure and maintains flow uniformity. Two solonoid valves 66 and 68 are provided in the event that one should malfunction. These valves are electrically operated and serve automatically to stop the flow of water when the console control 58 is off. Fine control of the water flow rate is obtained by adjusting the needle valve 70 which is operated manually while observing the indication of flow rate on the flowmeter 72 until the desired rate is obtained. The flowmeter is preferably calibrated to provide a reading ranging from 0.22 to 2.22 gallons per minute. Additives, either in liquid or soluble powdered form, may be added to the mixing chamber 76 utilizing the metering dispenser 80. Such additives may include preservatives, coloring, flavoring or other desired ingredients. The use of such additives is optional depending upon the product desired. The liquid then flows by gravity from the mixing system 17 through line 18 to the feed box 14.

FIG. 6 shows in greater detail the pre-cooker mixer-extruder and former 16 along with the associated power drives for the rotary cutter die disc 48 and intermediate conveyor 52. The extruder screw is driven by the drive chains 44 passing over the screw gear 45 and the output shaft gear 46 of adjustable speed power source 47, 49, 51. Also shown in FIG. 6 is hopper 8 with jack shaft 36 powered by drive chain 39 passing over jack shaft gear 37 and output shaft gear 41 of conventional variable speed drive power source 38, the speed of which may be regulated by turning crank wheel 42.

Focusing attention on the output end of the pre-cooker mixer-extruder and former in FIGS. 6 and 7 there is seen the rotary cutter die disc 48 held in place by a pair of outboard supports 86. The disc is fastened to a center shaft 88 the rotation of which causes the disc to rotate also. Disc shaft 88 carries a gear 90 over which passes a timing belt drive 92. The timing belt is driven by a gear 94 located on the end of a jack shaft 96. A gear 97 on the other end of this jack shaft 96 is driven by a drive chain 99 passing over a gear 98 of a right-angle gear drive unit 100. The power input shaft 102 of the right-angle gear drive unit 100 carries a change sprocket 104. A drive chain 106 passes over change sprocket 104 and an idler gear 108 and the reducer output gear 110 (FIG. 7) carried on reducer output shaft 112 of gear reducer 114. The speed reducer gear unit 114 is driven by a motor (FIG. 6) 116. The right-angle gear drive unit 100 carries an additional output gear 117 (FIG. 6) over which passes a drive chain 118 going to gear 120 of a right-angle gear drive 122. The output shaft 124 of the right-angle gear drive 122 carries a gear 126 over which passes a timing belt 128 which drives a gear 130 of the intermediate conveyor 52. Timing belt 128 and gears 126 and 130 are encased in a chain guard 132 for greater safety.

The use of timing belts to drive the rotary cutter die disc and the intermediate conveyor is for the purpose of assuring that in operation the rotary disc 48 is synchronized with the speed of the change sprocket 104 which is pre-set to the desired production rate and that the intermediate conveyor 52 is cooperating therewith also. The rotary speed of the cutter die disc 48 determines the rates at which the dough blanks are produced, and the extruder screw mechanism affects the rate at which the dough is expressed to the die disc 48. Thus, the speed of the extruder screw determines the pressure in the barrel which partly regulates the basic flow through the die. However, the flow through the die is primarily determined by the input of material, and the tortilla thickness and diameter are determined by varying the thickness (die slot orifice size). The length of the orifice slot is not adjustable.

In other words, if the operator is getting the correct weight of each tortilla but they are longitudinally oval-shaped (elongated), this means that the material is being extruded linearly too fast relative to the speed of the cutter disc. By opening the die slot so as to increase the thickness of each tortilla, the linear extrusion rate is correspondingly reduced. The same correct weight is still obtained, but now the tortillas are round, as desired. Conversely, if the tortillas are correct weight but are transverse oval-shaped (foreshortened), then the extruder die slot is reduced in size to increase the linear extrusion rate to produce round tortillas. The intermediate conveyor 52 removes them at the appropriate speed matched to the production rate. The speed of the intermediate conveyor 52 is governed by the preset rotary speed of the disc 48.

FIGS. 8A and 8B present a side elevational sectional view of the pre-cooker, mixer-extruder and former apparatus 16. Considering first the input or upstream end of the apparatus shown in FIG. 8A, it is seen that there is a housing 134 which is inclined to the horizontal at an angle suitable to insure that gravity will only allow mixed ingredients and not water to advance along the barrel. In this example, the angle is 8°. Thus, any unmixed liquid (free liquid) tends to run back into the feed box 114. The extruder screw permits the free liquid to run back because it has interrupted blades and runs at a relatively slow speed as compared to a water pump. The housing forms a pre-cooker and extruder mixing chamber 136 within which is located an extruder screw mechanism 138. This extruder screw is rotated by power applied to the power input shaft 140 situated upstream of the feed box 14. Located at the upstream end and bottom of the chamber 136 is a drain 142 into which is screwed a drain plug 144. Most of the annular periphery of the housing 134 surrounding the chamber 136 contains a water jacket 146, having entrance and exit ports, not illustrated. Lifting handles 148 are also shown because the chamber 136 can be quickly disassembled, as described in detail and claimed in a copending patent application of John G. Longenecker, Ser. No. 110,456, filed Jan. 28, 1971, and now U.S. Pat. No. 3,680,994.

The extruder screw mechanism 138 is a compound screw containing several sections, located along the length of the pre-cooking and mixing chamber 136. These sections include multiple individual pitched mixer blades 150 spaced at 90° angles on a shaft 152 in order to thoroughly mix and work the hot moist dough material therein. The screw sections also include continuous helical screw portions 160.

Located at spaced positions along the chamber 136 are bulkheads 154, as shown in FIG. 9, which separate the chamber 136 into sections A, B, C, and D. As seen in FIG. 9 each bulkhead has multiple oval shaped orifices 158 to ensure good mixing action upon passage of material therethrough. Beginning with the upstream or input end of the pre-cooker mixer-extruder and former apparatus 16 (FIG. 8A) there is seen chamber section A in which the flour and water is mixed together to form a moist hot dough while being advanced by means of a continuous helical screw 160. As shown in FIG. 8A the screw in chamber portion A includes a double helix for the last (i.e., downstream) one-third of the portion of the screw shaft contained within chamber portion A. The moist hot dough is advanced and propelled through the bulkhead orifices 158 into chamber portion B.

In chamber portion B (FIG. 8A) pitched mixer blades 150 pick up the dough and wipe clean the downstream side of the bulkhead separating chamber portions A and B. The mixer blades throughly mix and work the dough which is further mixed and advanced by double helix 160 which occupies approximately the downstream half of chamber portion B. The dough is advanced to chamber portion C through the orifices of another bulkhead wherein it is thoroughly mixed and advanced in a manner similar to that in chamber portion B. From chamber portion C the dough is propelled through the orifices of another bulkhead into chamber portion D which is also referred to as the feed chamber 156.

Downstream of the bulkhead, in the feed chamber 156, the extruder screw takes the form of a feed screw with a helical blade 160. The downstream half of the feed screw includes a double helix. Also located in the feed chamber D is a by-pass outlet 162 through which material may be permitted to exit if necessary. Normally the outlet 162 is kept closed with a valve, not shown. Immediately downstream of this outlet 162 is a material deflecting surface 164. An output nozzle 166 leads to an adjustable die indicated generally as 168 and downstream of the die is the rotary cutter die disc 48. The adjustable die finds utility in the present invention but forms no part thereof, the same being described in detail and claimed in said copending application, of John G. Longenecker.

Thus, the respective chamber sections A, B, C, and D alternately progressively advance, thoroughly mix and propell the moist hot dough while it is simultaneously being pre-cooked.

The pre-cooking dough is most thoroughly mixed in the mixing chamber 136 by the spaced blades 150 of the screw 152. Further mixing and propelling is obtained by the helical screws. The double helix assures advancement by acting on smaller slugs as segments of dough. To assure that the dough is mixed and not merely carried along, the bulkheads 154 with their mixing orifices 158 are provided. The dough passes through these orifices and into the feed chamber section D, wherein it is advanced to the die nozzle 158 for expressing. The cooperation of the developed openings 61 in the rotary disc 48 and die nozzle produce the round, thin-shape characteristic of the tortilla. It is to be emphasized that this step of the process is synchronized with the other previous steps for the maximum efficient operation. In the event of upset, then material may be permitted to exit through the bypass outlet 162, if necessary. The drain plug 144 may be opened allowing any excess water to flow back through the mixing chamber and out the drain 142.

FIG. 10 shows in detail the intermediate conveyor 52, and illustrates with dotted lines the position to which the conveyor input end may be retracted to permit diversion and rejection of dough blanks not meeting the desired specifications. The conveyor 52 includes an input end located downstream of the rotary cutter die disc, so as to be directly in the path of the dough blanks issuing from the die. A conveyor belt 170 passes over fixed rollers 172, adjustable take-up roller 174, drive gears 176, and tandem movable rollers 178. The entire roller and belt mechanism is carried in a frame 180.

FIG. 11 shows the continuous conveyor belt 170 which is constructed of interlaced wires 182 forming a center section 184 and two side sections 186. Woven through alternate wires in the center section 184 of the wire belt is a TEFLON filled glass fiber fabric 188 to prevent the leading edge of the tortilla blanks from entering into the space between the wires 182, thus assuring proper transfer of the blanks to the next conveyor.

The conveyor belt 170 is caused to move in the direction indicated (FIG. 10) by the action of drive gears 176 which are secured to the drive shaft 190. The drive shaft 190 is, in turn, powered by timing belt 128 (see FIG. 6). The belt side sections 186 form a chain which passes over the teeth 192 of the drive gears 176 resulting in a positive meshing. Tandem movable rollers 178 are joined together for mutual action by link 198. Each roller is slidable in slots 200 of frame 180. A slide link 202 pivotally connects one of the tandem movable rollers 178 with a lever 204 fixedly connected to a shaft 206 to which is joined a handle 208. Proper belt tension is maintained by adjusting take-up roller 174 by turning adjustment screw 196.

In operation, the wire belt conveyor 170 normally traverses a fixed path receiving pre-cooked dough blanks at its input end 168 and conveying them to the oven conveyor indicated at 54 (FIG. 10) in synchronization with the rest of the process. The dough blanks always lie flat on the wire belt since the presence of the wires and smooth non-stick fabric cause the leading edge of the dough blank to be guided into a flat position on a substantially continuous surface. Should the operator observe that the dough blanks fail to meet the desired specifications, he can divert them from the conveyor simply by moving the handle 208 in the direction indicated thus causing the shaft 206 to rotate and move the lever 204 and, through its pivotal connection, the slide link 202. The rollers 178 are thus moved from their normal position to the retracted position indicated by the dotted lines (FIG. 10) without change in belt length. The dough blank now may fall past the conveyor input end at 168 into a suitable receptacle. When normal operation is resumed, the handle is moved back to its previous position and locked in position by a ball plunger (not shown).

FIG. 12 shows an enlarged cross-sectional view through a properly formed and cooked tortilla, illustrating the moist central layer and the upper and lower light-colored, flexible blistered skins and having the proper commercially acceptable taste, texture and appearance.

It is pointed out that the mixed dough retains residual heat once it has been heated to the pre-cooking temperature range, so that the heated dough is actually continuously undergoing pre-cooking at all stages of the process prior to final cooking. Thus, there is pre-cooking while the dough is shaped into a blank and even while being conveyed to the oven. This is due in part to the short residence time in the mixer-extruder portion of the system, as well as in the die and on the intermediate conveyor. The continuous pre-cooking can be further assured by minimizing heat loss from the mixer-extruder, die and intermediate conveyor by appropriate conventional means.

It will be understood that the machine system herein with its pre-cooking feature is particularly suitable for the commercial manufacture of dough foodstuffs at a high rate with efficient and economical operation. The invention is particularly suitable for the manufacture of tortillas. Due to the pre-cooking, the oven dwell time is reduced to a minimum, so much so that an additional embodiment of the invention involves the use of a tandem production line both of which utilize the same rotary die cutter disc and feed into a single oven. Thus, one may have have two hoppers, two pre-cooking mixer-extruders and two intermediate conveyors with one oven. This permits the production of four hundred to six hundred tortillas per minute and results in considerable savings since the oven represents a substantial capital outlay in comparison with the other equipment and normally has been the bottleneck of the operation.

For maximum efficient operation, a delicate balance exists between the various steps of the components of the machine system. Thus, there has been provided means by which each step may be controllably regulated and synchronized with the remainder of the system. The flour feed and mixer-extruder throughout are controllable by adjusting the variable speed drive power source. The rotary former disc speed is preset to the desired production rate and the intermediate conveyor is timed to be in cooperation with it. The liquid temperature and flow rate are controlled. All of the adjustments to conform to the disc speed are readily made by the process operator. This machine system, therefore, provides pre-cooking of a dough-type product at a critical temperature range in the pre-cooker mixer-extruder to enable a minimum oven dwell time while avoiding the imbalance of burning the dough outside and leaving a raw inside.

What is claimed is:

1. A high speed cooked dough foodstuff producing machine system comprising:
   a flour hopper,
   a pre-cooking mixer-extruder and former,
   a feed screw in said flour hopper for conveying and measuring an amount of flour from said hopper to said mixer-extruder,
   a hot liquid feed metering and temperature control system leading into said mixer-extruder,
   said mixer-extruder including a composite extruder screw,
   said composite extruder screw having a mixing section and a feed section so that in one portion of the mixer-extruder the flour and liquid fed therein are thoroughly mixed into a dough and in another portion of this mixer-extruder the dough is advanced to the mixer-extruder exit,
   A shaping die located at the mixer-extruder exit through which dough is extruded,
   a rotary cutter die disc located downstream of said shaping die to sever extruded dough into dough blanks, and
   a conveyor for conveying the dough blank to an oven for cooking, and
   the actions of said feed screw, extruder screw, rotary die cutter disc and conveyor all being capable of being controllably regulated and synchronized with one another and the entire system.

2. A high speed cooked dough foodstuff producing machine system as claimed in claim 1, in which:
   the flour hopper and feed screw,
   the hot liquid feed system,
   the mixer-extruder shaping die, and
   the conveyor are all arranged in tandem in a dual assembly.

3. A high speed cooked dough foodstuff producing machine system as claimed in claim 1, in which
   the hot liquid feed system includes,
   means for heating the liquid,
   means for regulating the flow of liquid,
   means for measuring the liquid flow rate,
   means for metering and dispensing an additive to said liquid,
   a mixing chamber in which the liquid and additive are thoroughly combined, and
   a liquid delivery pipe.

4. A high speed cooked dough foodstuff producing machine system as claimed in claim 3, in which:
   the conveyor includes a conveyor belt passing over a series of rollers in a fixed length loop,
   means for displacing at least two rollers in mutual tandem action to change the conveyor belt path,
   thereby permitting the dough blank to bypass the conveyor.

5. A high speed cooked dough foodstuff product producing machine system as claimed in claim 1, in which:
   the mixer-extruder has a hot water jacket about its chamber,
   the mixing portion of the extruder screw has pitched blades spaced 90° on a shaft, the feed portion of the extruder screw has a screw helix of converging pitch downstream, the mixing portion and the extruder portion of said mixer extruder being separated by a bulkhead having at least one orifice for mixing action therein, and
   said mixer-extruder being positioned in an 8° angle upward inclination so that material therein drains upstream under the influence of gravity.

* * * * *